Nov. 10, 1942. G. B. DANIELSON 2,301,858
FILM-FEEDING DEVICE
Filed June 30, 1941 2 Sheets-Sheet 1

Inventor:
George Bernard Danielson
By Wallace and Cannon
Attorneys

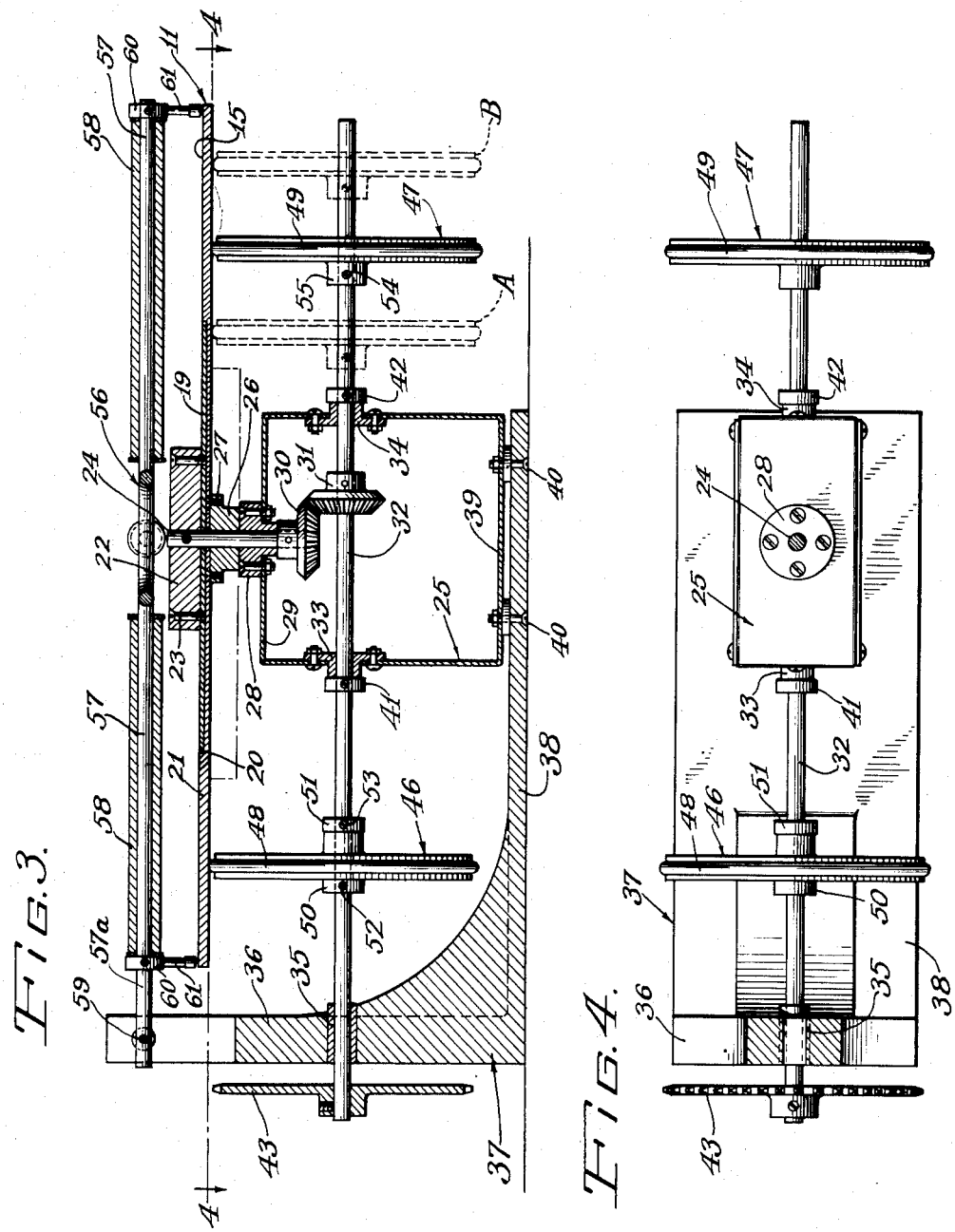

Patented Nov. 10, 1942

2,301,858

UNITED STATES PATENT OFFICE 2,301,858

FILM-FEEDING DEVICE

George Bernard Danielson, Chicago, Ill., assignor to Classroom Laboratories, Inc., Chicago, Ill., a corporation of Delaware Application June 30, 1941, Serial No. 400,386

9 Claims. (Cl. 88—18.7)

This invention relates to a film-feeding device for a motion picture projector.

More particularly, this invention relates to a film-feeding device for feeding a continuous reel of film through a motion picture projector.

For many uses of motion picture projectors, such as, for example, in the showing of educational films, in advertising devices or in the automatic coin-controlled machines, it is highly desirable, if not absolutely necessary, that endless or continuous reels of film be used so that it will not be necessary to keep an operator in constant attendance to change reels, or re-wind and re-insert the used or old reel in the projection machine upon the completion of each showing.

In the past, various forms of continuous film-feeding devices have been devised; most of them embodying elaborate mechanisms to keep the film feeding onto and off from the reel at the proper speeds and to prevent fouling of and consequent injury to the film.

In general, it has been found that the continuous film-feeding devices now known to the trade which have the adaptability, necessary in a successful commercial structure, are so complex, mechanically, that they require a person skilled in the art to make the adjustments which are necessary from time to time, such as, for example, when one film is substituted for another. Conversely, it has been found that those continuous film-feeding devices which have the desired mechanical simplicity are limited in their use and do not have the required adaptability to enable them to be used under the various conditions that a commercially successful film-feeding device must be adapted to meet.

Accordingly, it is an object of this invention to effect and realize a continuous film-feeding device which is substantially universally adaptable to the various conditions encountered in the art, and which is so mechanically simple that the average person, unskilled in the art, may make any mechanical adjustments on the device, which may be necessary from time to time.

The apparatus used in conjunction with my invention includes a motion picture projector; an endless reel or coil of film, wherein the film is preferably fed from the inner convolution of the reel, through the motion picture projector and back on to the outer convolution of the reel; and a turntable having the rotatable table portion, which is adapted to support the reel or coil of film, made up of a plurality of concentric discs or rings, wherein the speed of rotation of the outer disk or ring is readily adjustable by a simple adjustment of the driving member for that particular disc or ring so that the linear speed of that portion of the film which is being fed onto the relatively large outer convolution of the reel may be readily adjusted to equal the linear speed of that portion of the film which is being withdrawn from the relatively small inner convolution of the reel, and so that the various intermediate coils of film move at a substantially uniform linear speed with a minimum of slipping between the film and the turntable.

Therefore, it is another object of my invention to effect and realize a continuous film-feeding device wherein the linear speed of that portion of the film being fed onto the reel may be easily adjusted to equal the linear speed of that portion of the film being fed from the reel, by a simple mechanical adjustment.

Another object of my invention is to provide a continuous film-feeding device wherein the linear speed of the intermediate convolutions of the reel of film may be readily regulated, by a simple mechanical adjustment, so that it is substantially uniform throughout the various intermediate convolutions, with a minimum of slippage occurring between the film and the film-feeding device.

Another object of my invention is to produce an easily adjusted continuous film-feeding device wherein safeguards are embodied to prevent the reel of film from being accidentally dislodged therefrom.

A further object of my invention is to produce a continuous film-feeding device wherein the reel of film may be easily and readily changed by one not skilled in the art.

Another object of my invention is to so construct my device that, when inserting a new reel of film into the machine, it is not necessary for the operator to maneuver the film through complex loops and twists in running the film from the reel to the motion picture projector, or from the motion picture projector back onto the film reel.

A further object of my invention is to effect and realize a continuous film-feeding device which may be economically manufactured but which functions efficiently for the commercial use for which it is adapted.

Other and further objects of the present invention will be apparent from the following description and claims and are illustrated in the accompanying drawings which, by way of illustration, show a preferred embodiment and the principle thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings,

Fig. 3 is a substantially central sectional, elevational view of my novel device with the film removed; and Fig. 4 is a sectional view taken substantially along lines 4—4 of Fig. 3.

Figure 1:
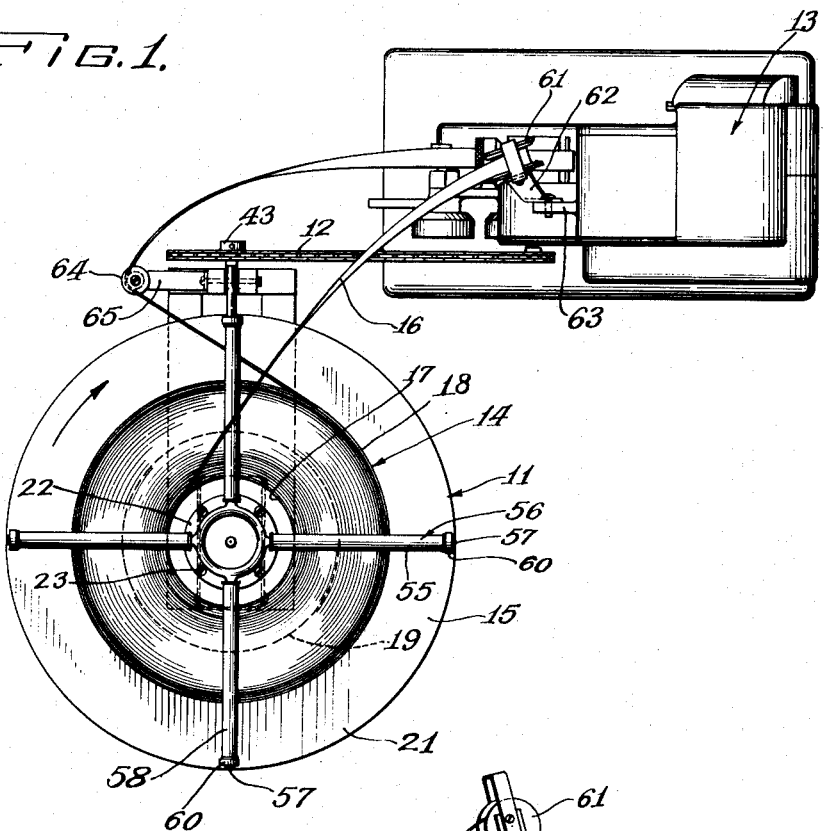
Fig. 1 is a top plan view of a preferred embodiment of my invention showing a reel of film resting on the turntable of my novel device and threaded through a motion picture projector.
Figure 2:
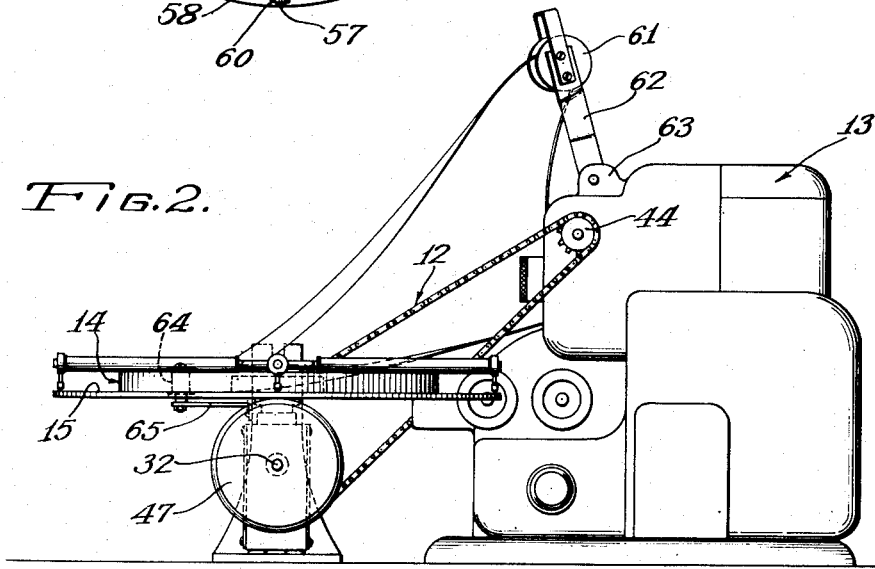
Fig. 2 is a side elevational view of the device as shown in Fig. 1.

In order to have a freely operating device of the type disclosed herein, it is obvious that because of the difference in their respective diameters, the outer convolution of the reel of film must be caused to rotate at a lower angular velocity than the inner convolutions of the same reel of film so that the linear velocity of the film winding upon and unwinding from these respective portions may be the same. The novel construction of my device by which it may be easily adjusted to perform these functions in an efficient and practical manner will be fully understood from the following description of the construction and operation of my device taken in conjunction with Figs. 1 to 4, inclusive, of the accompanying drawings.

A typical embodiment of my invention is illustrated in Figs. 1 to 4, inclusive, and, in general, comprises a turntable 11 suitably connected by connecting mechanism, such as the sprocket chain 12, to the driving mechanism of a motion picture projector 13. A reel of film 14 rests on the upper surface 15 of the turntable 11 in such a manner that upon rotation of the turntable 11 in a clockwise direction, as viewed in Fig. 1, the film 16 may be fed from the inner convolutions 17 of the reel 14 through the projector 13 and back onto the outer convolutions 18 of the reel 14.

It will be obvious that in a continuous film-feeding device of the type to which the present invention relates, it is necessary that the film be wound upon the outer portion of the reel 14 at the same linear speed that the film is fed from the inner portion thereof, and that the intermediate convolutions must not be allowed to pull tight and tear the film or become loose to such an extent that they fold upon one another and crease the film or otherwise foul or damage it.

In its preferred form, the turntable 11 of my continuous film-feeding device has an inner disc 19 and an outer disc 21 and the inner disc 19 is rotatably mounted in a depression 20 which is formed in the outer disc 21 which is rotatably mounted on a shaft 24, concentrically with the inner disc 19.

The inner disc 19 is securely fastened to the lower face of a central hub 22 by suitable fastening means such as screws 23, and the hub 22 is securely fastened, at its center, to the shaft 24 which extends downwardly through the centers of the inner disc 19 and the outer disc 21 into a gear box 25.

The outer disc 21 is securely fastened by proper fastening means, such as screws 27, to the upper face of a collar 26 which is rotatably mounted on the shaft 24. The lower face of the collar 26 rests on the upper face of a collar or sleeve 28 securely fastened to the upper wall 29 of the gear box 25, and through which the shaft 24 extends.

A bevel-gear 30 is secured to the lower end of the shaft 24 and meshes with a gear 31 secured to a drive shaft 32. The drive shaft 32 is properly journaled toward its center in bearings 33 and 34 provided in side walls of the gear box 25; and is properly journaled toward one end in a bearing 35 provided in the vertically extending arm 36 of a supporting member 37 which also has a horizontally extending arm 38 to which the bottom wall 39 of the gear box 25 is securely fastened by proper fastening means such as screws 40. Collars 41 and 42 fastened to the drive shaft 32, outside of the bearings 33 and 34, respectively, maintain the drive shaft 32 in its proper axial position.

A sprocket wheel 43 is securely fastened to a portion of the drive shaft 32 that extends outwardly from the vertically extending arm 36 of the supporting member 37, and is operatively connected to a sprocket wheel 44, which is part of the driving mechanism of the projector 13, by means of the sprocket chain 12.

Operation of the motion picture projector 13 with which the new film-feeding device is associated acts, through the sprocket wheel 44, the sprocket chain 12 and its sprocket wheel 43, to cause the drive shaft 32 to rotate, and the shaft 32 acts, through the bevel gears 30 and 31, the shaft 24 and the hub 22, to rotate the inner disc 19 in a clockwise direction as viewed in Fig. 1.

The ratio between the sprocket wheels 43 and 44, and the gears 30 and 31, is such that the inner disc 19 is caused to rotate at such a speed that the linear velocity at which the inner convolutions 17 of the film 16 are caused to unwind from the reel 14 is equal to the linear velocity at which the film 16 is drawn through the projector 13 (usually, 24 frames per second).

Two friction discs or wheels 46 and 47 are mounted on the drive shaft 32, one on either side of the gear box 25. Each of the friction discs or wheels 46 and 47 has an annular friction ring (48 and 49, respectively), around the periphery thereof, and each of these rings is preferably composed of rubber or other like material which has a relatively high coefficient of friction with respect to the material of which the outer disc 21 is composed, for reasons which will appear hereinafter.

The friction disc or wheel 46 is freely rotatable upon the drive shaft 32 between two collars 50 and 51 which are secured to the drive shaft 32 by suitable means such as screws 52 and 53, respectively, so that the position of the collars 50 and 51 and the wheel 46 may be easily adjusted axially of the drive shaft 32.

The other friction disc or wheel 47 is securely, although adjustably, fastened to the drive shaft 32 by suitable means, such as a screw 54 inserted through the hub 55, so that the position of the friction disc or wheel 47 may also be easily adjusted axially of the shaft.

It will be apparent from the foregoing description that when the drive shaft 32 is caused to rotate by operation of the driving mechanism of the projector 13, that the friction disc or wheel 47 will also rotate therewith.

Referring now to Fig. 3, it will be seen that the outer disc 21 is supported at its center portion by collars 26 and 28 and that it also rests upon the friction rings or tires 48 and 49 provided on the friction discs or wheels 46 and 47, respectively, and is supported thereby. Therefore, it will be apparent that upon rotation of the friction discs or wheel 47 with the drive shaft 32, the outer disc 21 of the turntable 11 will be caused to rotate through its frictional engagement with the friction ring or tire 49 upon the friction disc or wheel 47, and that the outer disc 21 will ride upon the idler wheel 46 and cause the latter to rotate upon the drive shaft 32.

Obviously, inasmuch as the friction disc or wheel 47 is fast to the drive shaft 32, which is driven at a constant speed by the sprocket wheel 44, acting through the sprocket chain 42 and the sprocket wheel 43, the friction disc or wheel 47 is also driven at a constant speed. Therefore, the angular velocity of the outer disc 21 is dependent upon the position or point at which the friction drive wheel or disc 47 engages the outer disc 21 during the operation of the projector 13, and varies in inverse proportion to the radial distance from the center of the outer disc 21 to the point where the friction disc or wheel 47 engages the outer disc 21.

For example, assuming that the friction disc or wheel 47 is disposed as in full line position (Fig. 3) upon the drive shaft 32 where it drives the outer disc 21 at a definite angular velocity.

(1) If it is desired to increase the angular velocity at which the outer disc 21 will rotate, the friction disc or wheel 47 may be moved radially inwardly, relative to the outer disc 21, along the drive shaft 32, toward or into dotted line position "A" (Fig. 3);

(2) If it is desired to decrease the angular velocity at which the outer disc 21 will rotate, the friction disc or wheel may be moved radially outwardly, relative to the outer disc 21, along the drive shaft 32 toward or into dotted line position "B" (Fig. 3).

The adjustments of the friction disc or wheel 47 on the shaft 32 may be made by employing a screw driver or like instrument to loosen and tighten the screw 54, whereupon the friction disc or wheel 47 may easily be shifted axially along the drive shaft 32 and the angular velocity of the outer disc 21 thereby determined and controlled.

To insure against the reel of film working off or being jarred off the turntable 11, I provide a spider 56 which has four arms 57, each having rollers 58 mounted thereon, and one of which arms 57 has an extension 57a pivotally connected to the upper end portion of the vertical extending arm 36 of the supporting member 37, as by means of pin 59.

Collars 60, having downwardly extending adjustable pins 61 secured thereto, are secured to the outer end portion of each of the arms 57, inwardly of the peripheral edge of the turntable 11, and act as a safeguard to prevent the reel of film 14 from being accidentally dislodged from the turntable 11.

A guide roller 61 is rotatably mounted on one end of a bracket 62, the other end of which is secured to a flange 63 provided on the upper portion of the projector 13. The bracket 62 is shaped to such an angle that it holds the guide roller 61 at the proper angle to support the film which is fed from the inner convolutions 17 of the film reels 14 to the projector 13 during the operation of the projector.

Similarly, a guide roller 64 is rotatably mounted on one end of a bracket 65, the other end of which is secured to the vertically extending arm 36 of the supporting structure 37. The guide roller 64 is supported by the bracket 65 in such a position that it may support and guide the film being fed from the projector 13 and wound onto the outer convolutions 18 of the film reel 14.

From the foregoing description it will be apparent that the average man, unskilled in the art, can easily operate, and make the necessary adjustments on my novel continuous film-feeding device.

The mode of operation of my invention is briefly as follows: In placing a new reel of film in the machine, the spider 56 is first swung into a vertical position upon the pin 59, the new reel of film 14 is then laid on the turntable 11, concentrically around the hub 22, and the coils thereof straightened so that there is no bunching or overlapping of the separate convolutions. The spider 56 is then swung down into a substantially horizontal plane so that the rollers 58 on the arms 57 rest on the reel 14 and tend to hold the reel 14 in flat contact with the turntable 11. The free end portion of the inner convolutions 17 of the reel of film 14 is then withdrawn from the reel 14 and threaded over the guide roller 61, down through the projector 13, over the guide roller 64 and is then spliced, by a method that is well known to the art, to the free end portion of film lying on the outer convolutions 18 of the reel 14.

During operation of the projector 13, the driving mechanism of the projector 14 causes sprocket wheel 44 to turn, and acts, through the sprocket chain 42 and the sprocket wheel 43, to drive the drive shaft 32. Rotation of drive shaft 32 acts, through the hub 22, the shaft 24 and the bevel gears 30 and 31, to rotate the inner disc 19 in a clockwise direction (as viewed in Fig. 1) at such a speed that the film 16 is caused to be fed from the inner convolutions of the reel 14 at the same linear velocity as it is drawn through the projector 14.

Rotation of the drive shaft 32 also acts through the friction disc 47, to rotate the outer turntable disc 21 at such an angular velocity that the film 16 which is returning from the projector 13 is caused to be wound upon the outer convolutions 18 of the reel 14 at the same linear velocity as that at which the film 16 is unwound from the inner convolutions 17 of the reel 14 and fed through the projector 13. Therefore, it will be seen that after the friction disc or wheel 47 has been properly located and positioned upon the drive shaft 32, which adjustment can be easily made by the average man not skilled in the art, my device will continuously feed the proper length of film to the projector 13 from the inner convolutions 17 of the reel 14 and will rewind the proper length of film, being fed from the projector, upon the outer convolutions 18 of the reel 14.

It may be desirable, in special instances, as, for example, where an exceptionally large reel of film or an exceptionally small reel of film is used, to use turntables of various sizes. In my device, turntables may be easily changed by merely removing the gear 30 from the shaft 24, lifting the turntable and shaft 24 off, and then placing another new turntable in position and fastening the gear 30 onto the end portion of the shaft 24 associated therewith.

It will be seen from the foregoing description, taken in conjunction with the accompanying drawings, that the present invention realizes and accomplishes its intended objects including those which have been specifically set forth hereinabove, as well as those which are otherwise apparent from the foregoing description and the accompanying drawings.

While I have illustrated and described a preferred embodiment of my invention it is to be understood that this is capable of variation and modification and I therefore do not wish to be limited to the precise details set forth but desire to avail myself of such changes and alterations as fall within the purview of the following claims.

I claim:

1. In a continuous film-feeding device, a turntable for supporting a coil of film, said turntable comprising substantially concentric inner and outer members, and means for driving said substantially concentric inner and outer members at different angular velocities relative to each other so as to enable the said turntable to transmit motion to the plies of the said coil of film at substantially the same linear velocity throughout the entire length of the said coil, said driving means comprising a driving member engageable with the said outer one of said substantially concentric members and adjustable radially of the said outer member so as to vary the angular velocity at which the said outer member is driven thereby.

2. A film-feeding device as defined in claim 1 in which the said driving member is engageable with the said outer member at the bottom of the latter.

3. In a continuous film-feeding device, a turntable for rotatably supporting a reel of film, said turntable comprising two substantially concentric rotatable members, a drive shaft, means operatively connecting said drive shaft to one of the said substantially concentric rotatable members, and rotatable means mounted on the said drive shaft for rotating the other of the said substantially concentric rotatable members, said rotatable means being adjustable axially along the said drive shaft so as to vary the speed at which the said rotatable means will rotate the said other of the said substantially concentric rotatable members.

4. In a continuous film-feeding device, a turntable for rotatably supporting a reel of film, said turntable comprising two substantially concentric rotatable members, driving means, means operatively connecting said driving means to one of the said substantially concentric rotatable members, and rotatable means operatively engaged with said driving means and adapted to rotate the other of the said substantially concentric rotatable members, said rotatable means being adjustable radially of the said substantially concentric rotatable members so as to vary the speed at which the said rotatable means will rotate the said other of the said substantially concentric rotatable members.

5. In a continuous film-feeding device, a turntable for rotatably supporting a reel of film, said turntable comprising two substantially concentric rotatable discs, driving means, including a drive shaft, means operatively connecting the said drive shaft to the radially inner one of said rotatable discs, and rotatable means mounted on the said drive shaft for supporting the radially outer portion of the radially outer one of said rotatable discs, said rotatable means comprising a drive wheel mounted on the said drive shaft and adapted to rotate the said radially outer one of said rotatable discs upon rotation of the said drive shaft, said drive wheel being adjustable radially relative to the said rotatable discs so as to vary the angular velocity at which the said drive wheel will rotate the said radially outer one of said rotatable discs.

6. The film-feeding device defined in claim 5 in which the said rotatable means mounted on the said drive shaft comprises an idler wheel rotatably mounted on the said drive shaft and rotatable with the said radially outer one of said rotatable discs and in which the said drive wheel is adjustable axially relative to and along the said drive shaft.

7. The film-feeding device defined in claim 5 in which the said rotatable means mounted on the said drive shaft also include an idler wheel, and in which both the said idler wheel and the said drive wheel are frictionally engaged with the said radially outer one of the said substantially concentric discs at the bottom side thereof.

8. In a continuous film-feeding device, a gear housing, driving means, including a drive shaft journaled in said gear housing, an idler wheel rotatably mounted on said drive shaft at one side of the said gear housing, a drive wheel mounted on the said drive shaft to rotate therewith at the side of the said gear housing opposite the side thereof at which the said idler wheel is arranged, a substantially vertically extending shaft operatively connected to said drive shaft within the said gear housing, a turntable for rotatably supporting a reel of film, said turntable comprising substantially concentric inner and outer discs, said outer disc resting on the peripheral edge portions of the said idler wheel and of the said drive wheel and being rotatable by the said drive wheel, said inner disc being mounted on the upper end portion of the said substantially vertically extending shaft and rotatable therewith above the upper surface of the said outer disc, and said drive wheel being adjustable axially of the said drive shaft so as to vary the angular velocity at which the said drive wheel drives the said outer disc.

9. In a continuous film-feeding device for a motion picture projector, the combination of, a turntable for rotatably supporting a coil of film so that the film is wound upon the outer convolutions and unwound from the inner convolutions of the coil during operation of the said projector, said turntable comprising substantially concentric inner and outer discs, means for driving said inner disc at a speed directly proportional to the operating speed of the said motion picture projector with which the said film-feeding device is used, and means for driving said outer disc, including a drive wheel adjustable radially of said outer disc, said drive wheel having its peripheral edge portion in contact with said outer disc and being adapted to rotate said outer disc at various angular velocities depending on the radial position to which said drive wheel is adjusted relative to said outer disc.

GEORGE BERNARD DANIELSON.